(12) United States Patent
Sakieda et al.

(10) Patent No.: US 12,092,455 B2
(45) Date of Patent: Sep. 17, 2024

(54) ABSOLUTE ENCODER FOR REDUCING INFLUENCE OF A LEAKAGE MAGNETIC FLUX

(71) Applicant: MINEBEA MITSUMI Inc., Nagano (JP)

(72) Inventors: Takeshi Sakieda, Nagano (JP); Katsunori Saito, Nagano (JP); Yujin Ishi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 103 days.

(21) Appl. No.: 17/759,744

(22) PCT Filed: Jan. 27, 2021

(86) PCT No.: PCT/JP2021/002842
§ 371 (c)(1),
(2) Date: Jul. 29, 2022

(87) PCT Pub. No.: WO2021/153614
PCT Pub. Date: Aug. 5, 2021

(65) Prior Publication Data
US 2023/0071255 A1    Mar. 9, 2023

(30) Foreign Application Priority Data

Jan. 31, 2020 (JP) ................. 2020-015093

(51) Int. Cl.
*G01B 7/30* (2006.01)
*G01D 5/14* (2006.01)
*G01D 5/16* (2006.01)

(52) U.S. Cl.
CPC .............. *G01B 7/30* (2013.01); *G01D 5/145* (2013.01); *G01D 5/16* (2013.01)

(58) Field of Classification Search
CPC ...... G01D 5/12; G01D 5/14–147; G01D 5/16; G01B 7/30; G01R 33/02; G01R 33/06–077

See application file for complete search history.

(56) References Cited

U.S. PATENT DOCUMENTS

| | | | | |
|---|---|---|---|---|
| 7,535,219 B2 * | 5/2009 | Shiraga | .................... | G01B 7/30 73/514.39 |
| 2004/0257070 A1 * | 12/2004 | Takuma | .................... | G01D 5/04 310/68 B |

(Continued)

FOREIGN PATENT DOCUMENTS

| | | |
|---|---|---|
| CN | 108138767 A | 6/2018 |
| EP | 3 332 122 B1 | 6/2020 |

(Continued)

OTHER PUBLICATIONS

Office Action dated Jul. 5, 2023 for corresponding Taiwanese Application No. 110103502 and English translation.

(Continued)

*Primary Examiner* — Huy Q Phan
*Assistant Examiner* — David B Frederiksen
(74) *Attorney, Agent, or Firm* — Pearne & Gordon LLP

(57) ABSTRACT

The influence of a leakage magnetic flux from a magnet on a magnetic sensor configured to detect a magnetic flux from the permanent magnet is reduced. An absolute encoder includes a first magnet provided at a leading end side of a first worm gear part, a first angle sensor configured to detect a rotation angle of the first worm gear part corresponding to a change in a magnetic flux generated from the first magnet, a second magnet provided at a leading end side of a second worm wheel part, a second angle sensor configured to detect a rotation angle of the second worm wheel part corresponding to a change in a magnetic flux generated from the second (Continued)

magnet, and a gear base part configured to surround at least a part of a periphery of the first angle sensor and the second angle sensor.

4 Claims, 10 Drawing Sheets

(56) References Cited

U.S. PATENT DOCUMENTS

| | | | |
|---|---|---|---|
| 2008/0000712 A1* | 1/2008 | Tanaka | B62D 15/0215 |
| | | | 73/117.02 |
| 2011/0080162 A1* | 4/2011 | Steinich | G01B 7/30 |
| | | | 324/207.25 |
| 2011/0278905 A1* | 11/2011 | Ikeda | B60R 22/34 |
| | | | 324/207.13 |
| 2013/0015333 A1 | 1/2013 | Miyajima et al. | |
| 2014/0269235 A1* | 9/2014 | Gong | G11B 5/112 |
| | | | 205/255 |
| 2018/0230997 A1 | 8/2018 | Dearden | |
| 2018/0375405 A1 | 12/2018 | Saito | |
| 2019/0383642 A1* | 12/2019 | Okada | G01D 5/145 |
| 2020/0132507 A1* | 4/2020 | Osada | G01D 5/14 |
| 2020/0280245 A1 | 9/2020 | Osada et al. | |

FOREIGN PATENT DOCUMENTS

| | | | | |
|---|---|---|---|---|
| JP | 01-110215 A | 4/1989 | | |
| JP | 05-055020 U | 7/1993 | | |
| JP | 09-308171 A | 11/1997 | | |
| JP | 2006-158059 A | 6/2006 | | |
| JP | 2007-078430 A | 3/2007 | | |
| JP | 2007-263190 A | 10/2007 | | |
| JP | 2013-024572 A | 2/2013 | | |
| JP | 2017-009312 A | 1/2017 | | |
| JP | 2019-009885 A | 1/2019 | | |
| WO | 2013/069524 A1 | 5/2013 | | |
| WO | WO-2019009186 A1 * | 1/2019 | | G01D 5/12 |
| WO | 2019/059173 A1 | 3/2019 | | |
| WO | 2020/203466 A1 | 10/2020 | | |

OTHER PUBLICATIONS

International Search Report for corresponding International Application No. PCT/JP2021/002842 mailed Mar. 23, 2021.

Written Opinion for corresponding International Application No. PCT/JP2021/002842 dated Mar. 23, 2021 and English translation.

* cited by examiner

# ABSOLUTE ENCODER FOR REDUCING INFLUENCE OF A LEAKAGE MAGNETIC FLUX

CROSS-REFERENCE TO RELATED APPLICATIONS

This application is a national stage entry of International Application No. PCT/JP2021/002842 filed on Jan. 27, 2021, which claims the benefit of priority to Japanese Application No. JP2020-015093, filed Jan. 31, 2020, the entire disclosures of which are hereby incorporated herein by reference.

TECHNICAL FIELD

The present invention relates to an absolute encoder.

BACKGROUND ART

In the related art, a known rotary encoder is used for detecting a position and an angle of a movable element in various control mechanical devices. Examples of such a rotary encoder include an incremental encoder for detecting a relative position or angle and an absolute encoder for detecting an absolute position or angle.

In such an absolute encoder, for example, an absolute rotary encoder including a plurality of magnetic encoder units for detecting angle positions of a main shaft and a sub-shaft by using magnetism and configured to measure an absolute position of the main shaft from the detection result is known (for example, see PTL 1).

CITATION LIST

Patent Literature

PTL 1: JP 2013-24572 A

SUMMARY OF INVENTION

Technical Problem

However, a part of a magnetic flux generated from an adjacent permanent magnet such as a magnet of a motor or a magnet outside a device affects a magnetic sensor, that is, a magnetic detection element, and thus the absolute encoder disclosed in PTL 1 may have reduced detection accuracy due to an influence of noise from an external element other than a magnetic flux from the permanent magnet supposed to be detected.

The present invention has been made in view of the above-mentioned problems, and an object of the present invention is to provide an absolute encoder configured to reduce, on a magnetic sensor for detecting a magnetic flux from a permanent magnet, the influence of a leakage magnetic flux from the permanent magnet not supposed to be detected.

Solution to Problem

To achieve the above-described object, an absolute encoder according to the present invention includes a first driving gear configured to rotate according to rotation of a main spindle, a first permanent magnet provided at a leading end side of the first driving gear, a first angle sensor configured to detect a rotation angle of the first driving gear corresponding to a change in a magnetic flux generated from the first permanent magnet, a first driven gear having a central axis orthogonal to a central axis of the first driving gear and configured to mesh with the first driving gear, a second driving gear provided coaxially with the first driven gear and configured to rotate according to rotation of the first driven gear, a second driven gear having a central axis orthogonal to a central axis of the first driven gear and configured to mesh with the second driving gear, a second permanent magnet provided at a leading end side of the second driven gear, a second angle sensor configured to detect a rotation angle of the second driven gear corresponding to a change in a magnetic flux generated from the second permanent magnet, and a gear base configured to surround at least a part of a periphery of the first angle sensor and the second angle sensor. The gear base is formed of an annealed magnetic body.

To achieve the above-described object, a gear base according to the present invention is manufactured by a machining process of performing machining on a plate-shaped member formed of ferritic stainless steel and an annealing process of annealing the machined plate-shaped member in a vacuum or hydrogen atmosphere at an annealing temperature of 800° C. to 900° C.

Advantageous Effects of Invention

The absolute encoder according to the present invention allows for reducing the influence of a leakage magnetic flux, not supposed to be detected, from a permanent magnet on a magnetic sensor for detecting a magnetic flux from the permanent magnet.

DESCRIPTION OF EMBODIMENTS

Figure 1:
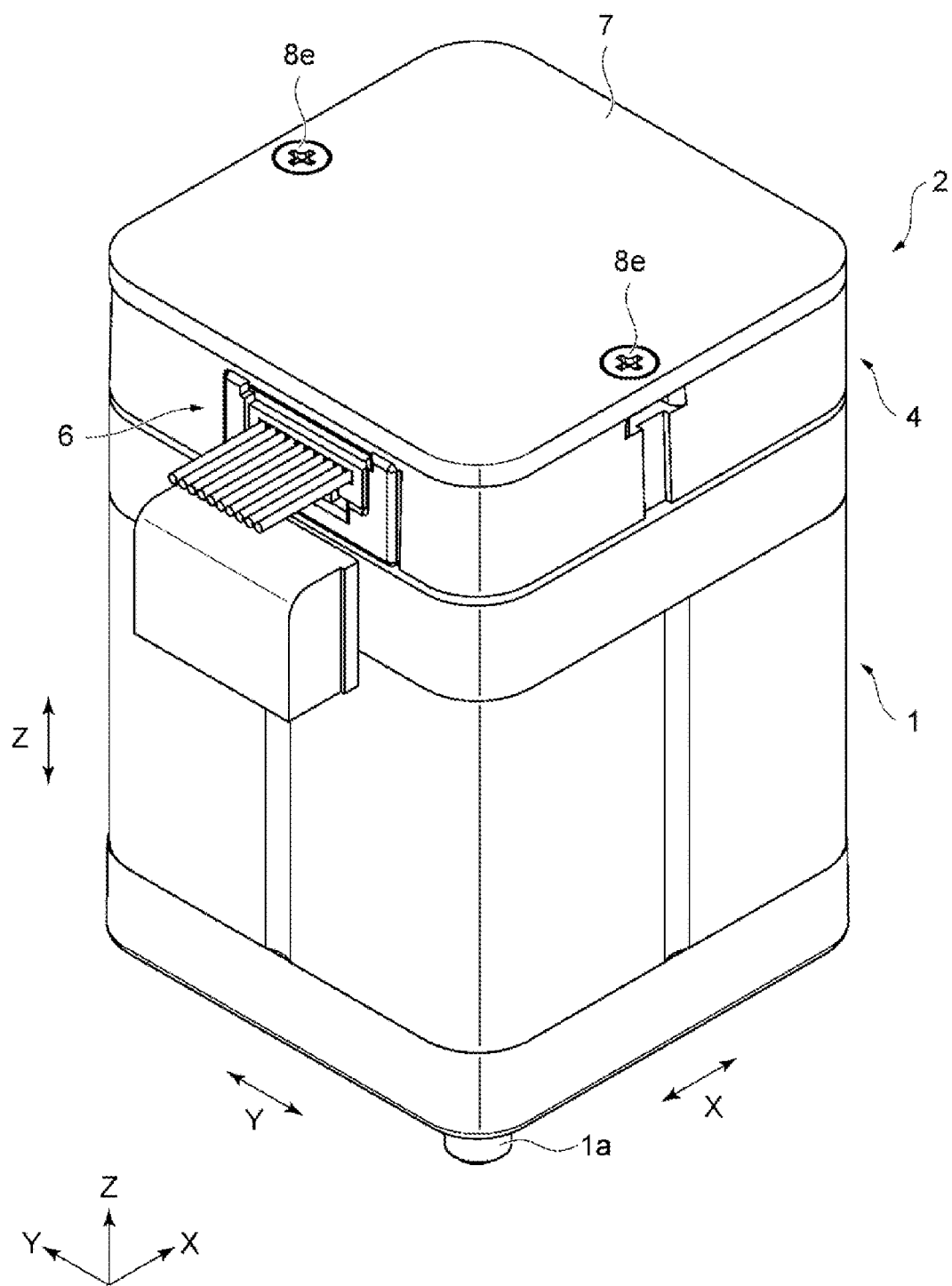
FIG. 1 is a perspective view schematically illustrating the configuration of an absolute encoder according to an embodiment of the present invention.

The present inventors have found that in an absolute encoder, the amount of rotation over a plurality of numbers of rotations (hereinafter, also referred to as a plurality of rotations) of the main spindle (hereinafter, also referred to as the amount of rotation of a main spindle) can be specified by acquiring the rotation angle of a rotating body configured to decelerate and rotate with the rotation of the main spindle. That is, the amount of rotation of the main spindle can be specified by multiplying the rotation angle of the rotating body by a reduction ratio. The specifiable range of the amount of rotation of the main spindle increases in proportion to the reduction ratio. For example, when the reduction ratio is 50, the amount of rotation for 50 rotations of the main spindle can be specified.

On the other hand, the required resolution of the rotating body decreases in proportion to the reduction ratio. For example, when the reduction ratio is 100, the resolution required for the rotating body per rotation of the main spindle is 3.6° (=360°/100), and the detection accuracy of ±1.8° is required. On the other hand, when the reduction ratio is 50, the resolution required for the rotating body per rotation of the main spindle is =7.2° (360°/50), and the detection accuracy of ±3.6° is determined.

Embodiments of the present invention are described below with reference to the drawings. In each of the embodiments and modifications to be described below, the same or equivalent components and members are denoted by the same reference numerals, and duplicate description will be omitted as appropriate. Furthermore, the dimensions of the members in each drawing are appropriately enlarged or reduced in order to facilitate understanding. Furthermore, some of members not important for explaining the embodiment in each drawing are omitted and displayed. Furthermore, in the drawings, gears are illustrated by omitting a tooth shape. Furthermore, terms including ordinal numbers such as $1^{st}$ and $2^{nd}$ are used for describing various components, but the terms are used only for the purpose of distinguishing one component from other components, and components are not limited by the terms. The present invention is not limited by the present embodiment.

Figure 2:
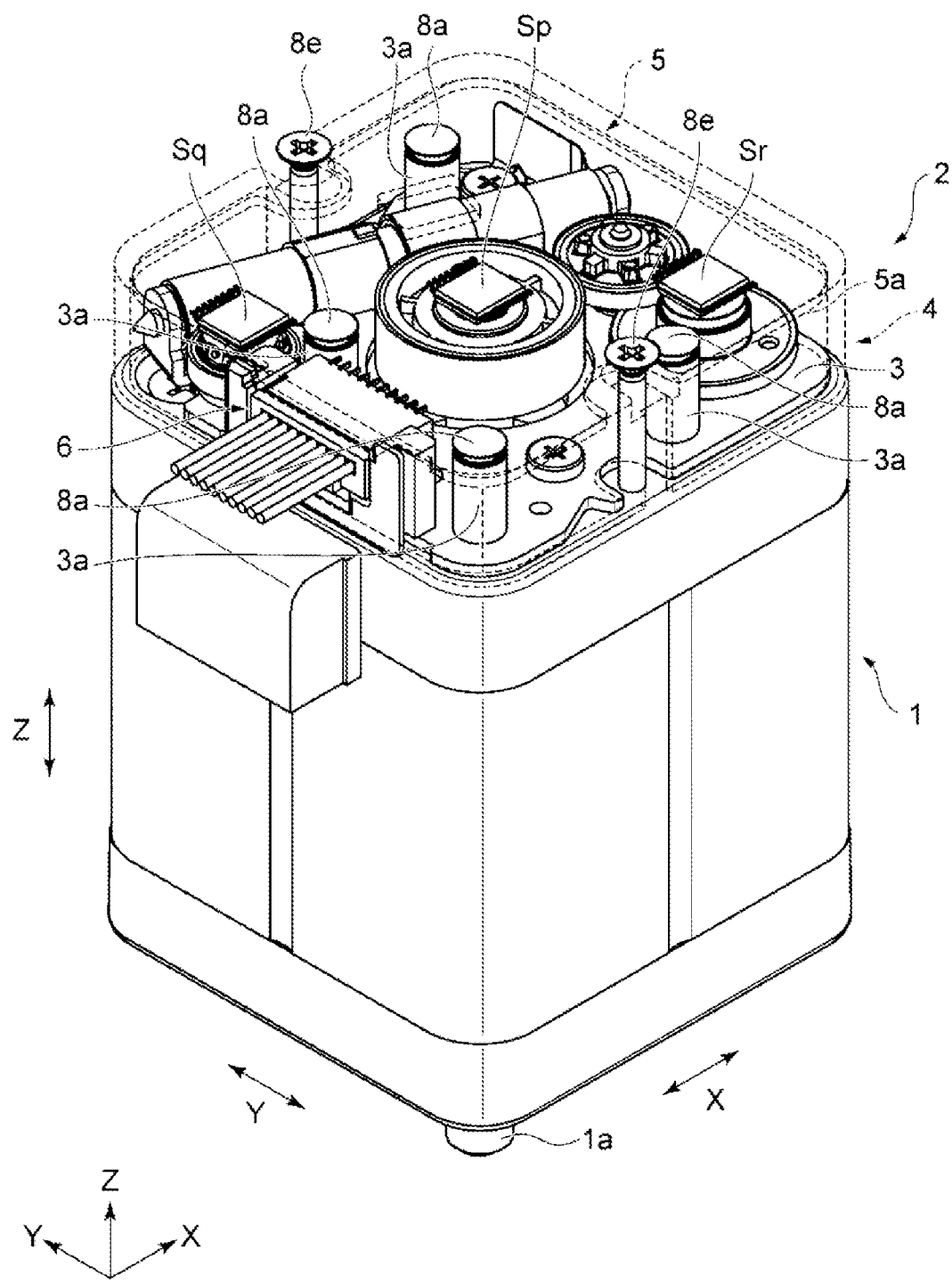
FIG. 2 is a perspective view schematically illustrating the configuration of the absolute encoder illustrated in FIG. 1 with a shield plate removed.
Figure 3:
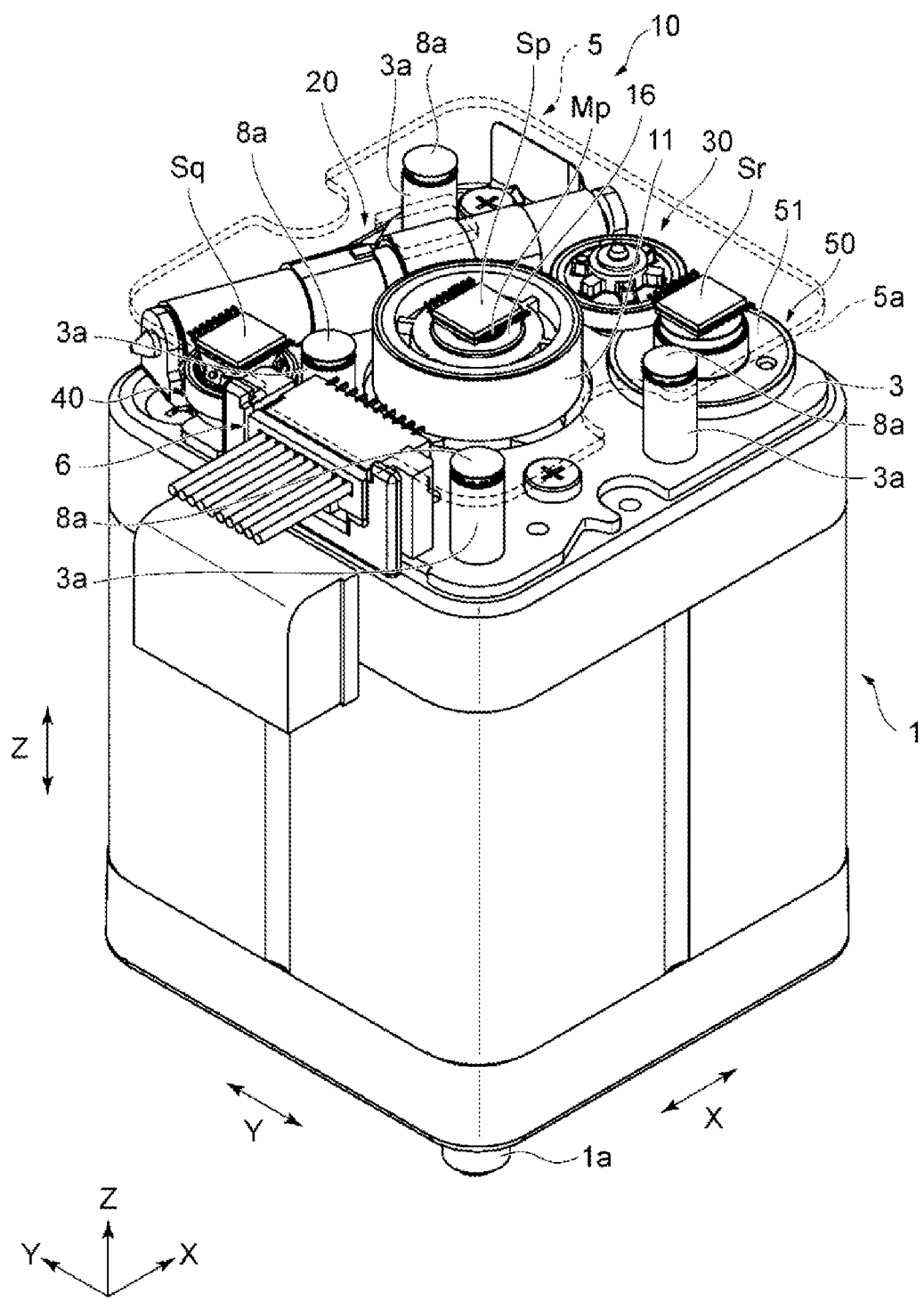
FIG. 3 is a perspective view schematically illustrating the configuration of the absolute encoder illustrated in FIG. 2 with a case removed.
Figure 4:
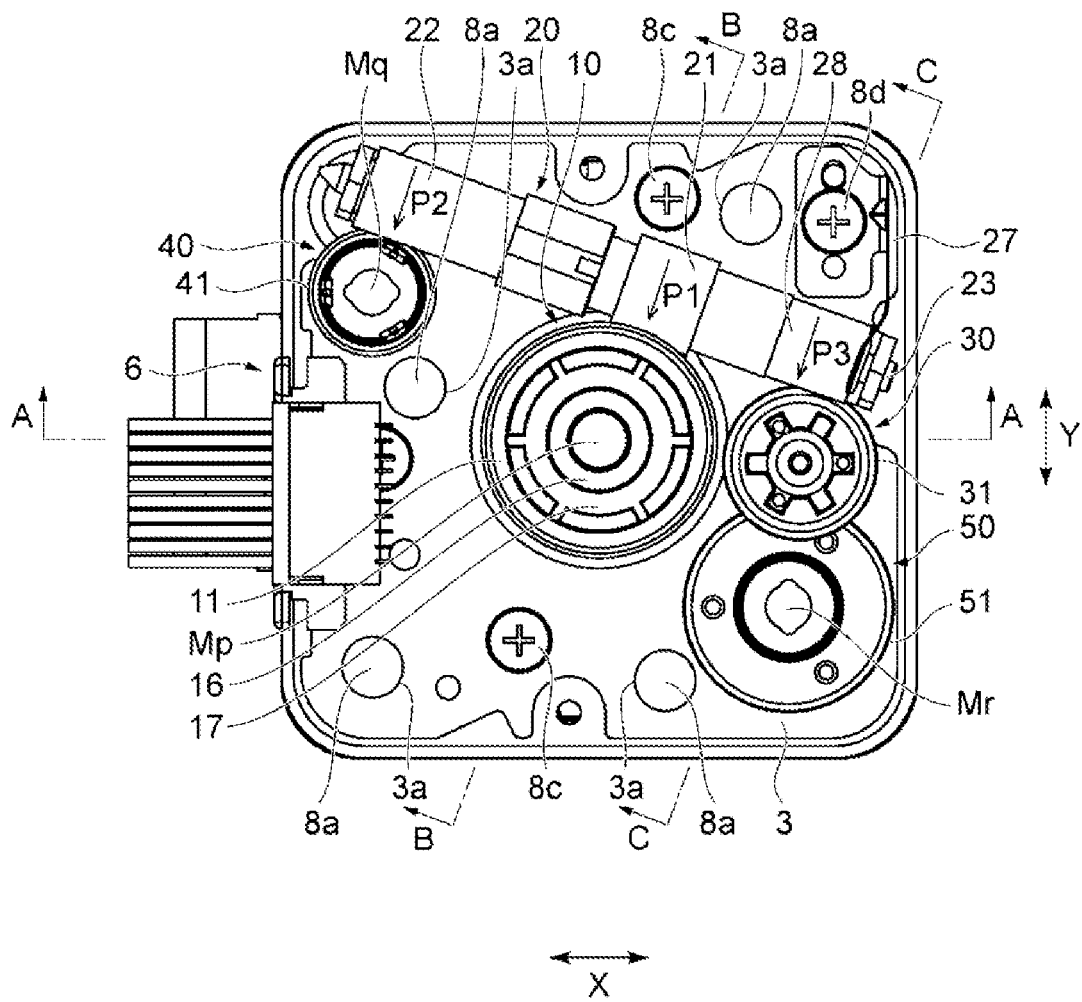
FIG. 4 is a plan view schematically illustrating the configuration of the absolute encoder illustrated in FIG. 3 with a substrate removed.

FIG. 1 is a perspective view schematically illustrating the configuration of an absolute encoder 2 according to an embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed.

As illustrated in FIG. 1 to FIG. 4, the absolute encoder 2 according to an embodiment of the present invention includes a first worm gear part 11, a magnet Mp, an angle sensor Sp, a first worm wheel part 21, a second worm gear part 22, a second worm wheel part 41, a magnet Mq, an angle sensor Sq, and a gear base part 3. The first worm gear part 11 is a first driving gear and rotates according to the rotation of a main spindle 1a. The magnet Mp is provided as a first permanent magnet on a leading end side of the first worm gear part 11. The angle sensor Sp is a first angle sensor and detects a rotation angle of the first worm gear part 11 corresponding to a change in a magnetic flux generated from the magnet Mp. The first worm wheel part 21 is a first driven gear, has a central axis orthogonal to a central axis of the first worm gear part 11, and meshes with the first worm gear part 11. The second worm gear part 22 is a second driving gear, is provided coaxially with the first worm wheel part 21, and rotates according to the rotation of the first worm wheel part 21. The second worm wheel part 41 is a second driven gear, has a central axis orthogonal to the central axis of the first worm wheel part 21, and meshes with the second worm gear part 22. The magnet Mq is provided as a second permanent magnet on a leading end side of the second worm wheel part 41. The angle sensor Sq is a second angle sensor and detects a rotation angle of the second worm wheel part 41 corresponding to a change in a magnetic flux generated from the magnet Mq. The gear base part 3 surrounds at least a part of the periphery of the angle sensor Sp and the angle sensor Sq as a magnetic flux shielding member. The gear base part 3 is formed of an annealed magnetic body. Hereinafter, the structure of the absolute encoder 2 is specifically described.

In the present embodiment, for convenience of description, the absolute encoder 2 is described based on an XYZ orthogonal coordinate system. The X-axis direction corresponds to a horizontal left-right direction, the Y-axis direction corresponds to a horizontal front-rear direction, and the Z-axis direction corresponds to a vertical direction. The Y-axis direction and the Z-axis direction are orthogonal to the X-axis direction, respectively. In the present description, the X-axis direction is also referred to as a left side or a right side, the Y-axis direction is also referred to as a front side or a rear side, and the Z-axis direction is also referred to as an upper side or a lower side. In the orientation of the absolute encoder 2 illustrated in FIGS. 1 and 2, a left side in the X-axis direction is the left side and a right side in the X-axis direction is the right side. Furthermore, in the orientation of the absolute encoder 2 illustrated in FIGS. 1 and 2, a front side in the Y-axis direction is the front side and a back side in the Y-axis direction is the rear side. Furthermore, in the orientation of the absolute encoder 2 illustrated in FIGS. 1 and 2, an upper side in the Z-axis direction is on the upper side and a lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions does not limit the usage orientation of the absolute encoder 2, and the absolute encoder 2 may be used in any orientation.

As described above, the absolute encoder 2 is an absolute encoder configured to specify and output the amount of rotation over a plurality of rotations of the main spindle 1a of a motor 1. In an embodiment of the present invention, the absolute encoder 2 is provided at an upper end part of the motor 1 in the Z-axis direction. In the embodiment of the present invention, the absolute encoder 2 has a substantially rectangular shape in the plan view and has a thin and horizontally long rectangular shape in the vertical direction, that is, the extension direction of the main spindle 1a in the front view and the side view. That is, the absolute encoder 2 has a flat rectangular parallelepiped shape longer in the horizontal direction than in the vertical direction.

The absolute encoder 2 includes the case 4 having a hollow square tubular shape and accommodating an internal structure. The case 4 includes a plurality of (for example, four) outer wall portions 4a surrounding at least a part of the main spindle 1a of the motor 1, a main spindle gear 10, a first intermediate gear 20, a second intermediate gear 30, a first sub-shaft gear 40, a second sub-shaft gear 50, and the like, and has an open upper end part. In the case 4, the shield plate 7 serving as a second magnetic flux shielding member and being a rectangular plate-shaped member is fixed to the case 4 and the gear base part 3 by screws 8e at the upper end parts of the four outer wall portions 4a opened.

The shield plate 7 is a plate-shaped member provided between the angle sensors Sp, Sq, and Sr and the outside of the absolute encoder 2 in the axial direction (Z-axis direction). The shield plate 7 is formed of a magnetic body in order to prevent magnetic interference due to a magnetic flux generated outside the absolute encoder 2 by the angle sensors Sp, Sq, and Sr provided inside the case 4.

As an example, the motor 1 may be a stepping motor or a DC brushless motor. As an example, the motor 1 may be a motor applied as a driving source for driving a robot for an industrial use or the like via a reduction mechanism such as a wave gear device. Both sides of the spindle 1a of the motor 1 in the vertical direction project from the case of the motor. The absolute encoder 2 outputs the amount of rotation of the main spindle 1a of the motor 1 as a digital signal.

The motor 1 has a substantially rectangular shape in the plan view and has a substantially rectangular shape even in the vertical direction. That is, the motor 1 has a substantially cubic shape. In the plan view, each of the four outer wall portions constituting the outer shape of the motor 1 has a length of, for example, 25 mm, that is, the outer shape of the motor 1 is 25 mm square in the plan view. Furthermore, the absolute encoder 2 provided in the motor 1 is, for example, a 25 mm square according to the outer shape of the motor 1.

In FIGS. 1 and 2, the angle sensor support substrate 5 is provided to cover the inside of the absolute encoder 2 together with the case 4 and the shield plate 7.

Figure 5:
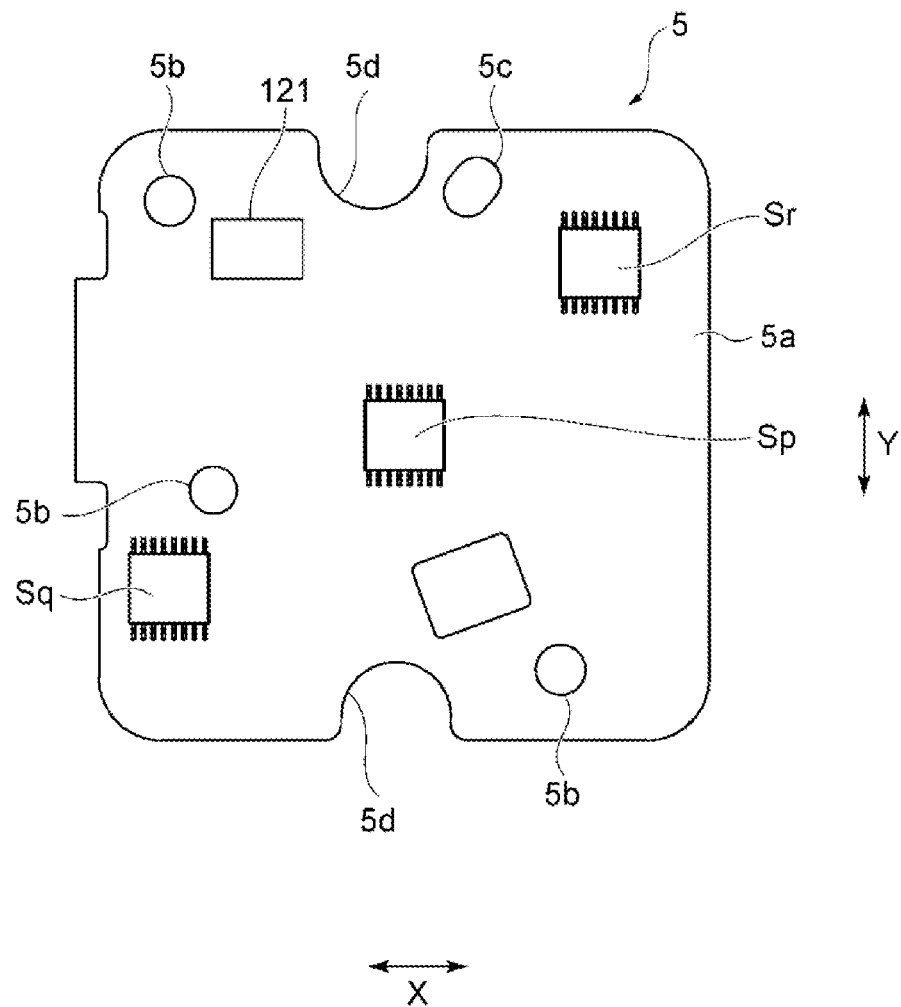
FIG. 5 is a view illustrating an angle sensor support substrate illustrated in FIG. 3 when viewed from a lower surface side.

FIG. 5 is a diagram of the angle sensor support substrate 5 when viewed from the lower side. As illustrated in FIG. 5, the angle sensor support substrate 5 has a substantially rectangular shape in the plan view and is a thin plate-shaped printed wiring substrate in the vertical direction. Furthermore, a connector 6 is connected to the angle sensor support substrate 5 and is for connecting the absolute encoder 2 and an external device (not illustrated).

As illustrated in FIGS. 2 and 3, the absolute encoder 2 includes the main spindle gear 10 having the first worm gear part 11 (first driving gear), the first intermediate gear 20 having the first worm wheel part 21 (first driven gear), the second worm gear part 22 (second driving gear), and a third worm gear part 28 (third driving gear), the second intermediate gear 30 having a third worm wheel part 31 (third driven gear) and a first spur gear part 32 (fourth driving gear), the first sub-shaft gear 40 having the second worm wheel part 41 (second driven gear), the second sub-shaft gear 50 having a second spur gear part 51 (third driven gear), the magnet Mp, the angle sensor Sp corresponding to the magnet Mp, the magnet Mq, the angle sensor Sq corresponding to the magnet Mq, a magnet Mr, an angle sensor Sr corresponding to the magnet Mr, and a microcomputer 121 illustrated in FIG. 5.

Figure 6:
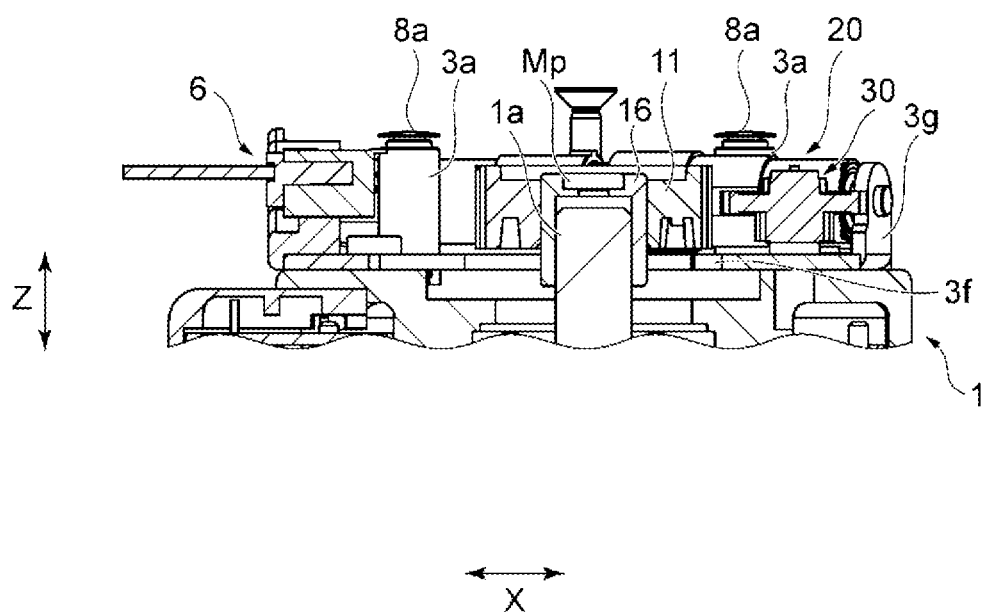
FIG. 6 is a cross-sectional view of the absolute encoder illustrated in FIG. 4 taken along line A-A.

FIG. 6 is a cross-sectional view of the absolute encoder 2 taken along line A-A.

As illustrated in FIG. 4 and FIG. 6, the main spindle 1a of the motor 1 is an output shaft of the motor 1 and is an input shaft configured to transmit a rotational force to the absolute encoder 2. The main spindle gear 10 is fixed to the main spindle 1a of the motor 1 and is rotatably supported by a bearing member of the motor 1 integrally with the main spindle 1a. The first worm gear part 11 is provided on an outer periphery of the main spindle gear 10 and rotates according to the rotation of the main spindle 1a of the motor 1. In the main spindle gear 10, the first worm gear part 11 is provided so that the central axis of the first worm gear part 11 matches or substantially matches a central axis of the main spindle 1a. The main spindle gear 10 can be formed of various materials such as a resin material or a metal material. The main spindle gear 10 is formed of, for example, a polyacetal resin.

As illustrated in FIG. 3 and FIG. 4, the first intermediate gear 20 is a gear part configured to transmit the rotation of the main spindle gear 10 to the first sub-shaft gear 40 and the second intermediate gear 30. The first intermediate gear 20 is pivotally supported by a shaft 23 around a rotation axis extending substantially parallel to a base portion 3b. The first intermediate gear 20 is a substantially cylindrical member extending in the direction of the rotation axis. The first intermediate gear 20 includes the first worm wheel part 21, the second worm gear part 22, and the third worm gear part 28, is formed therein with a through hole, and the shaft 23 is inserted into the through hole. The first intermediate gear 20 is pivotally supported by inserting the shaft 23 into first intermediate gear shaft support portions 3g provided on the base portion 3b of the gear base part 3. The first worm wheel part 21, the second worm gear part 22, and the third worm gear part 28 are disposed at positions separated from each other in this order. The first intermediate gear 20 can be formed of various materials such as a resin material or a metal material. The first intermediate gear 20 is formed of a polyacetal resin.

Figure 7:
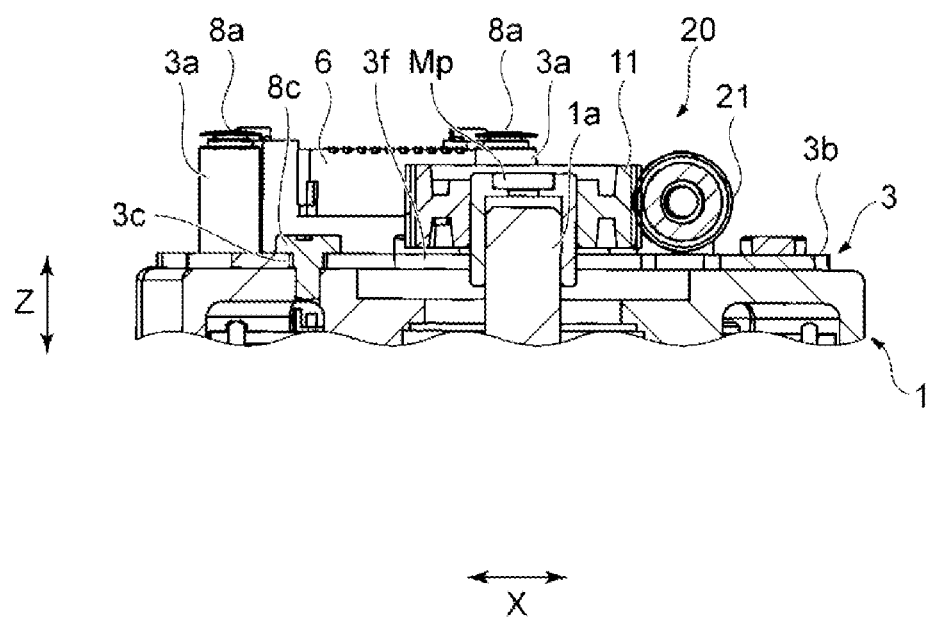
FIG. 7 is a cross-sectional view of the absolute encoder illustrated in FIG. 4 taken along line B-B.

FIG. 7 is a cross-sectional view of the absolute encoder 2 taken along line B-B.

As illustrated in FIG. 4 and FIG. 7, the first worm wheel part 21 is provided on an outer periphery of the first intermediate gear 20 and is provided to mesh with the first worm gear part 11 and rotate according to the rotation of the first worm gear part 11. An axial angle between the first worm wheel part 21 and the first worm gear part 11 is set to 90° or approximately 90°.

Although there is no special restriction on an outer diameter of the first worm wheel part 21, in the illustrated example, the outer diameter of the first worm wheel part 21 is set to be smaller than the outer diameter of the first worm gear part 11, and the outer diameter of the first worm wheel part 21 is small. With this, the absolute encoder 2 is reduced in size in the vertical direction.

The second worm gear part 22 is provided on the outer periphery of the first intermediate gear 20 and rotates with the rotation of the first worm wheel part 21. In the first intermediate gear 20, the second worm gear part 22 is provided so that a central axis of the second worm gear part 22 matches or substantially matches the central axis of the first worm wheel part 21.

Figure 8:
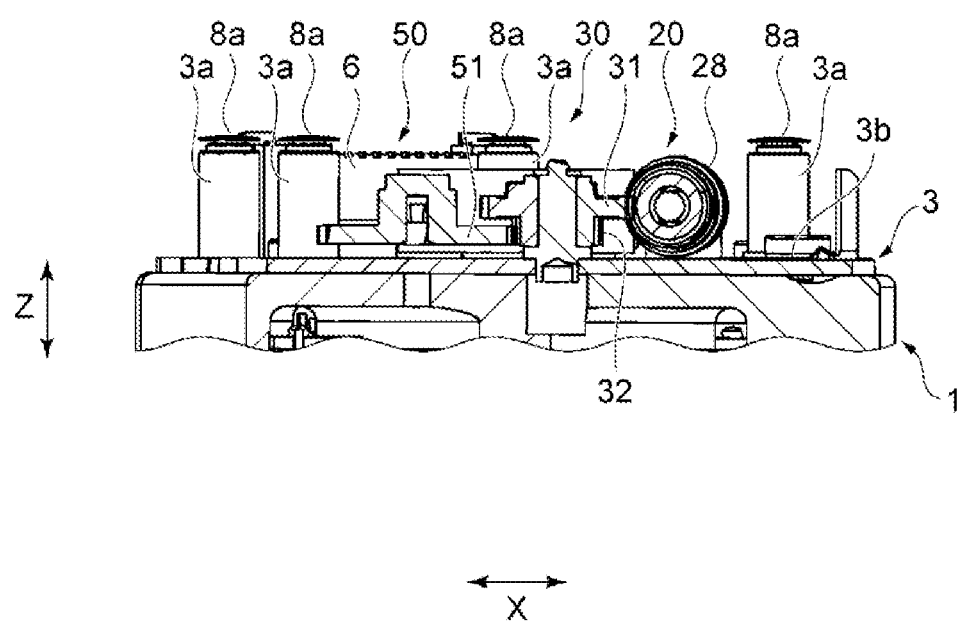
FIG. 8 is a cross-sectional view of the absolute encoder illustrated in FIG. 4 taken along line C-C.

FIG. 8 is a cross-sectional view of the absolute encoder 2 taken along line C-C.

As illustrated in FIG. 4 and FIG. 8, the third worm gear part 28 is provided on the outer periphery of the first intermediate gear 20 and rotates with the rotation of the first worm wheel part 21. In the first intermediate gear 20, the third worm gear part 28 is provided so that a central axis of the third worm gear part 28 matches or substantially matches the central axis of the first worm wheel part 21.

As illustrated in FIG. 4, the first sub-shaft gear 40 is decelerated according to the rotation of the motor shaft and rotates integrally with the magnet Mq. The first sub-shaft gear 40 is a member having a substantially circular shape in the plan view, is pivotally supported by a shaft protruding substantially vertically from the base portion 3b of the gear base part 3, and includes the second worm wheel part 41 and a holding part configured to hold the magnet Mq. The first sub-shaft gear 40 can be formed of various materials such as a resin material or a metal material. The first sub-shaft gear 40 is formed of a polyacetal resin.

The second worm wheel part 41 is provided on an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. A rotation axis of the second worm wheel part 41 is provided parallel to or substantially parallel to a rotation axis of the first worm gear part 11.

In FIG. 4 and FIG. 8, the second intermediate gear 30 is a disk-shaped gear part configured to rotate according to the rotation of the main spindle 1*a*, decelerate the rotation of the main spindle 1*a*, and transmit the decelerated rotation to the second sub-shaft gear 50. The second intermediate gear 30 is provided between the second worm gear part 22 and the second spur gear part 51 provided in the second sub-shaft gear 50. The second spur gear part 51 meshes with the first spur gear part 32. The second intermediate gear 30 includes the third worm wheel part 31 configured to mesh with the third worm gear part 28 of the first intermediate gear 20, and the first spur gear part 32 configured to drive the second spur gear part 51. The second intermediate gear 30 is formed of, for example, a polyacetal resin. The second intermediate gear 30 is a substantially circular member in the plan view. The second intermediate gear 30 is pivotally supported by the base portion 3*b* of the gear base part 3.

Providing the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, providing the second intermediate gear 30 enables the expansion of the range allowing the reduction ratio to be set, improving the degree of freedom in design.

The third worm wheel part 31 is provided on an outer periphery of the second intermediate gear 30 and is provided to mesh with the third worm gear part 28 and rotate according to the rotation of the third worm gear part 28. The first spur gear part 32 is provided on the outer periphery of the second intermediate gear 30 so that a central axis of the first spur gear part 32 matches or substantially matches a central axis of the third worm wheel part 31. The first spur gear part 32 is provided to mesh with the second spur gear part 51 and rotate according to the rotation of the third worm wheel part 31. A rotation axis of the third worm wheel part 31 and the first spur gear part 32 is provided parallel to or substantially parallel to the rotation axis of the first worm gear part 11.

In FIG. 8, the second sub-shaft gear 50 is a gear part having a circular shape in the plan view, rotates according to the rotation of the main spindle 1*a*, decelerates the rotation of the main spindle 1*a*, and transmits the decelerated rotation to the magnet Mr. The second sub-shaft gear 50 is pivotally supported around a rotation axis extending substantially vertically from the base portion 3*b* of the gear base part 3. The second sub-shaft gear 50 includes the second spur gear part 51 and a magnet holding part configured to hold the magnet Mr.

The second spur gear part 51 is provided on an outer periphery of the second sub-shaft gear 50 so that a central axis of the second spur gear part 51 matches or substantially matches the central axis of the first spur gear part 32. The second spur gear part 51 is provided to mesh with the first spur gear part 32 and rotate according to the rotation of the third worm wheel part 31. A rotation axis of the second spur gear part 51 is provided parallel to or substantially parallel to the rotation axis of the first spur gear part 32. The second sub-shaft gear 50 can be formed of various materials such as a resin material or a metal material. The second sub-shaft gear 50 is formed of a polyacetal resin.

Hereinafter, a direction of the first worm wheel part 21 facing the first worm gear part 11 to mesh with the first worm gear part 11 is referred to as a first meshing direction P1 (direction of arrow P1 in FIG. 4). Similarly, a direction of the second worm gear part 22 facing the second worm wheel part 41 to mesh with the second worm wheel part 41, is referred to as a second meshing direction P2 (direction of arrow P2 in FIG. 4). Moreover, a direction of the third worm gear part 28 facing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed to an upper surface of the main spindle gear 10 so that the central axes of the magnet Mp and the main spindle gear 10 match or substantially match each other. The magnet Mp is supported by a magnet support part 17 provided on a central axis of the main spindle gear 10 via a holder part 16. The holder part 16 is formed of a non-magnetic body such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has bipolar magnetic poles arranged in a direction perpendicular to a rotation axis of the main spindle gear 10. In order to detect a rotation angle of the main spindle gear 10, the angle sensor Sp is provided on a lower surface 5*a* of the angle sensor support substrate 5 so that a lower surface of the angle sensor support Sp faces the upper surface of the magnet Mp in the vertical direction via a gap.

As an example, the angle sensor Sp is fixed to the angle sensor support substrate 5 supported by a substrate post 110 disposed at the gear base part 3 to be described below in the absolute encoder 2. The angle sensor Sp detects the magnetic pole of the magnet Mp, and outputs detection information to the microcomputer 121. The microcomputer 121 specifies the rotation angle of the main spindle gear 10, that is, a rotation angle of the main spindle 1*a*, by specifying a rotation angle of the magnet Mp on the basis of the received magnetic pole-related detection information. The resolution of the rotation angle of the main spindle 1*a* corresponds to the resolution of the angle sensor Sp. As will be described below, the microcomputer 121 specifies the amount of rotation of the main spindle 1*a* on the basis of a specified rotation angle of the first sub-shaft gear 40 and the specified rotation angle of the main spindle 1*a*, and outputs the specified amount of rotation. As an example, the microcomputer 121 may output the amount of rotation of the main spindle 1*a* of the motor 1 as a digital signal.

The angle sensor Sq detects the rotation angle of the second worm wheel part 41, that is, the rotation angle of the first sub-shaft gear 40. The magnet Mq is fixed to an upper surface of the first sub-shaft gear 40 so that the central axes of the magnet Mq and the first sub-shaft gear 40 match or substantially match each other. The magnet Mq has bipolar magnetic poles arranged in a direction perpendicular to a rotation axis of the first sub-shaft gear 40. As illustrated in FIG. 3, in order to detect the rotation angle of the first sub-shaft gear 40, the angle sensor Sq is provided so that a lower surface of the angle sensor Sq faces an upper surface of the magnet Mq in the vertical direction via a gap.

As an example, the angle sensor Sq is fixed to the angle sensor support substrate 5 on the same surface as the surface where the angle sensor Sp is fixed, the angle sensor Sp being fixed to the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed to an upper surface of the second sub-axis gear 50 so that the central axes of the magnet Mr and the second sub-shaft gear 50 match or substantially match each other. The magnet Mr has bipolar magnetic poles arranged in a direction perpendicular to a rotation axis of the second sub-shaft gear 50. As illustrated in FIG. 3, in order to detect the rotation angle of the second sub-shaft gear 50, the angle sensor Sr is provided so that a lower surface of the angle sensor Sr faces an upper surface of the magnet Mr in the vertical direction via a gap.

As an example, the angle sensor Sr is fixed to the angle sensor support substrate 5 supported by the substrate post 110 disposed at the gear base part 3 to be described below in the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each magnetic sensor. The magnetic angle sensor is disposed to face an end face including magnetic poles of each permanent magnet in the axial direction of each rotating body via a certain gap, specifies a rotation angle of an opposing rotating body on the basis of the rotation of these magnetic poles, and outputs a digital signal. Examples of the magnetic angle sensor include a detection element configured to detect a magnetic pole and an arithmetic circuit configured to output a digital signal on the basis of the output of the detection element. The detection element may include, for example, a plurality of (for example, four) magnetic field detection elements such as a Hall element or a giant magneto-resistive (GMR) element.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each magnetic sensor outputs an angle signal to the microcomputer 121 as a digital signal corresponding to the rotation angle of each rotating body detected via a wiring member (not illustrated). For example, each magnetic sensor outputs the rotation angle of each rotating body as a digital signal of multiple bits (for example, 7 bits).

Figure 9:
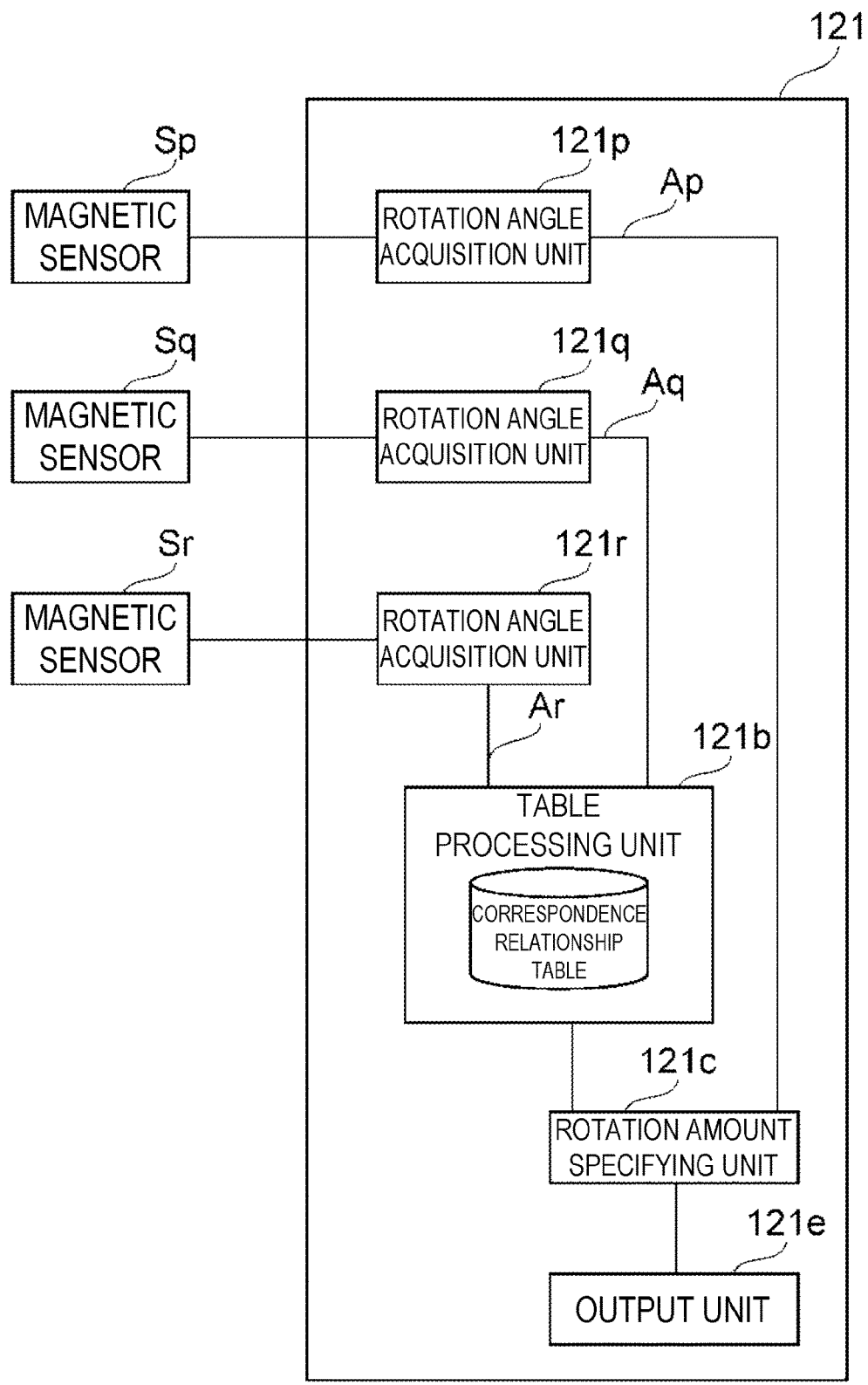
FIG. 9 is a block diagram schematically illustrating a functional configuration of the absolute encoder illustrated in FIG. 1.

FIG. 9 is a diagram illustrating a functional configuration of the microcomputer 121 included in the absolute encoder 2. The microcomputer 121 is fixed to a surface of the angle sensor support substrate 5 by a method such as soldering or bonding, the surface facing the base portion 3b of the gear base part 3. The microcomputer 121 includes a CPU, acquires the digital signal output from each of the angle sensors Sp, Sq, and Sr and representing the rotation angle, and calculates the amount of rotation of the main spindle gear 10. Each block of the microcomputer 121 illustrated in FIG. 9 represents a function implemented by the CPU as the microcomputer 121 executing a program. Each block of the microcomputer 121 can be implemented by an element or a mechanical device such as a central processing unit (CPU) or a random access memory (RAM) of a computer, in terms of hardware, and is implemented by a computer program or the like in terms of software, but in the present specification, function blocks implemented by cooperation of hardware and software are drawn. Accordingly, it is understood by those skilled in the art who have read the present specification that these functional blocks can be implemented in various forms by combining hardware and software.

The microcomputer 121 includes a rotation angle acquisition unit 121p, a rotation angle acquisition unit 121q, a rotation angle acquisition unit 121r, the table processing unit 121b, the rotation amount specifying unit 121c, and the output unit 121e. The rotation angle acquisition unit 121p acquires a rotation angle Ap as angle information indicating the rotation angle of the main spindle gear 10, that is, the main spindle 1a, on the basis of a signal output from the angle sensor Sp. The rotation angle acquisition unit 121q acquires a rotation angle Aq as angle information indicating the rotation angle of the first sub-shaft gear 40 on the basis of a signal output from the angle sensor Sq. The rotation angle acquisition unit 121r acquires a rotation angle Ar as angle information indicating the rotation angle of the second sub-shaft gear 50 detected by the angle sensor Sr.

The table processing unit 121b refers to a first correspondence relationship table with the rotation angle Ap and the number of rotations of the main spindle gear 10 corresponding to the rotation angle Ap stored and specifies the number of rotations of the main spindle gear 10 corresponding to the acquired rotation angle Ap. Furthermore, the table processing unit 121b refers to a second correspondence relationship table with the rotation angle Ar and the number of rotations of the main spindle gear 10 corresponding to the rotation angle Ar stored and specifies the number of rotations of the main spindle gear 10 corresponding to the acquired rotation angle Ar.

The rotation amount specifying unit 121c specifies a first amount of rotation over a plurality of rotations of the main spindle gear 10 according to the number of rotations of the main spindle gear 10 specified by the table processing unit 121b and the acquired rotation angle Aq. The output unit 121e converts the amount of rotation of the main spindle gear 10 specified by the rotation amount specifying unit 121c over the plurality of rotations into information indicating the amount of rotation, and outputs the information.

The absolute encoder 2 configured in this way can specify the number of rotations of the main spindle 1a according to the rotation angles of the first sub-shaft gear 40 and the second sub-shaft gear 50 specified on the basis of the detection information of the angle sensors Sq and Sr, and specify the rotation angle of the main spindle 1a on the basis of the detection information of the angle sensor Sp. Then, the microcomputer 121 specifies the amount of rotation of the main spindle 1a over a plurality of rotations on the basis of the specified number of rotations of the main spindle 1*a* and the specified rotation angle of the main spindle 1*a*.

The number of rows of the first worm gear part 11 of the main spindle gear 10 provided on the main spindle 1*a* is, for example, 1, and the number of teeth of the first worm wheel part 21 is, for example, 20. That is, the first worm gear part 11 and the first worm wheel part 21 constitute a first transmission mechanism having a reduction ratio of 20 (=20/1) (see FIG. 4). When the first worm gear part 11 rotates 20 times, the first worm wheel part 21 rotates once. Since the first worm wheel part 21 and the second worm gear part 22 are provided coaxially to form the first intermediate gear 20 and rotate integrally, when the first worm gear part 11 rotates 20 times, that is, when the main spindle 1*a* and the main spindle gear 10 rotate 20 times, the first intermediate gear 20 rotates once and the second worm gear part 22 rotates once.

The number of rows of the second worm gear part 22 is, for example, 5, and the number of teeth of the second worm wheel part 41 is, for example, 25. That is, the second worm gear part 22 and the second worm wheel part 41 constitute a second transmission mechanism having a reduction ratio of 5 (=25/5) (see FIG. 4). When the second worm gear part 22 rotates five times, the second worm wheel part 41 rotates once. Since the first sub-shaft gear 40 formed by the second worm wheel part 41 rotates integrally with a magnet holder 35 and the magnet Mq as will be described below, when the second worm gear part 22 constituting the first intermediate gear 20 rotates five times, the magnet Mq rotates once. From the above, when the main spindle 1*a* rotates 100 times, the first intermediate gear 20 rotates five times and the first sub-shaft gear 40 and the magnet Mq rotate once. That is, the number of rotations for 50 rotations of the main spindle 1*a* can be specified by detection information of the angle sensor Sq regarding the rotation angle of the first sub-shaft gear 40.

The number of rows of the third worm gear part 28 is, for example, 1, and the number of teeth of the third worm wheel part 31 is, for example, 30. That is, the third worm gear part 28 and the third worm wheel part 31 constitute a third transmission mechanism having a reduction ratio of 30 (=30/1) (see FIG. 4). When the third worm gear part 28 rotates 30 times, the third worm wheel part 31 rotates once. The second intermediate gear 30 formed by the third worm wheel part 31 is provided with the first spur gear part 32 having the central axis matching or substantially matching the central axis of the third worm wheel part 31. Therefore, when the third worm wheel part 31 rotates, the first spur gear part 32 also rotates. Since the first spur gear part 32 meshes with the second spur gear part 51 provided in the second sub-shaft gear 50, when the second intermediate gear 30 rotates, the second sub-shaft gear 50 also rotates.

The number of teeth of the second spur gear part 51 is, for example, 40, and the number of teeth of the first spur gear part 32 is, for example, 24. That is, the first spur gear part 32 and the second spur gear part 51 constitute a fourth transmission mechanism having a reduction ratio of 5/3 (=40/24) (see FIG. 4). When the first spur gear part 32 rotates five times, the second spur gear part 51 rotates three times. Since the second sub-shaft gear 50 formed by the second spur gear part 51 rotates integrally with the magnet Mr as will be described below, when the third worm gear part 28 constituting the first intermediate gear 20 rotates five times, the magnet Mr rotates once. From the above, when the main spindle 1*a* rotates 1,000 times, the first intermediate gear 20 rotates 50 times, the second intermediate gear 30 rotates 5/3 times, and the second sub-shaft gear 50 and the magnet Mr rotate once. That is, the number of rotations for 1,000 rotations of the main spindle 1*a* can be specified by detection information of the angle sensor Sr regarding the rotation angle of the second sub-shaft gear 50.

Hereinafter, the configuration of the absolute encoder 2 is described more specifically.

As described above (see FIGS. 1 to 5), the absolute encoder 2 includes the gear base part 3, the case 4, the angle sensor support substrate 5, and the connector 6. Furthermore, the absolute encoder 2 includes the main spindle gear 10, the first intermediate gear 20, the second intermediate gear 30, the first sub-shaft gear 40, and the second sub-shaft gear 50. Furthermore, the absolute encoder 2 includes the magnets Mp, Mq, and Mr and the angle sensors Sp, Sq, and Sr, and also includes the microcomputer 121 for controlling the driving part, the detection part, and the like of the absolute encoder 2.

As illustrated in FIG. 6, the gear base part 3 is a plate-shaped member provided in the axial direction (Z-axis direction) between the angle sensors Sp, Sq, and Sr and the motor 1 as a drive source for rotating the main spindle 1*a*. The gear base part 3 rotatably holds each rotating body included in the absolute encoder 2 such as the main spindle gear 10, the first intermediate gear 20, and the first sub-shaft gear 40. Furthermore, the gear base part 3 is a base for fixing, to the motor 1, each member included in an absolute encoder 2 such as the angle sensor support substrate 5.

Figure 10:
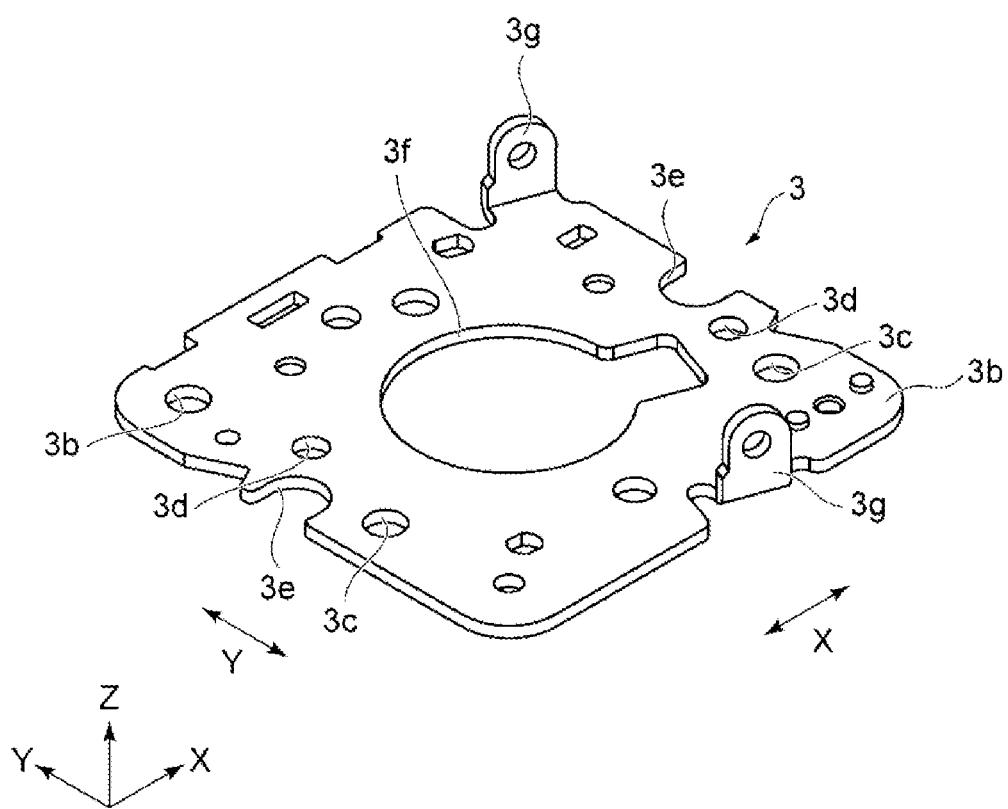
FIG. 10 is a perspective view of a gear base part as a magnetic flux shielding member in the configuration of the absolute encoder illustrated in FIG. 3.

FIG. 10 is a perspective view of the gear base part 3 as a magnetic flux shielding member in the configuration of the absolute encoder 2. As illustrated in FIG. 10, the gear base part 3 includes a plurality of (for example, four) posts 3*a*, a base portion 3*b*, and post support holes 3*c*, screw holes 3*d*, notch portions 3*e*, a main spindle insertion hole 3*f*, and the first intermediate gear shaft support portions 3*g* as machined portions.

The gear base part 3 is formed of a magnetic body in order to function as a magnetic flux shielding member configured to magnetically shield a magnetic flux from the outside of the absolute encoder 2 such as the motor 1. Specifically, in the gear base part 3, the machined portions such as the post support holes 3*c*, the screw holes 3*d*, the notch portions 3*e*, the main spindle insertion hole 3*f*, and the first intermediate gear shaft support portions 3*g* are formed on the base portion 3*b* by various types of machining, such as drilling and bending, the base portion 3*b* being a plate-shaped member formed of ferritic stainless steel (for example, SUS430). The gear base part 3 is annealed after the machined portions are formed on the base portion 3*b* by such machining. The manufacturing method of the gear base part 3 is described below.

The base portion 3*b* of the gear base part 3 is a plate-shaped portion facing the motor 1 side of the absolute encoder 2, and extends in the X-axis direction and the Y-axis direction to be able to surround at least a part of the periphery of the angle sensors Sp, Sq, and Sr. In the base portion 3*b* of the gear base part 3, the case 4 having a hollow square tubular shape is fixed by a plurality of (for example, two) screws 8*e*.

The posts 3*a* disposed at the gear base part 3 are substantially columnar parts protruding from the base portion 3*b* in a direction away from the motor 1 in the axial direction and support the angle sensor support substrate 5 at positions separated from the magnets Mp, Mq, and Mr in the axial direction of the main spindle 1*a*. The posts 3*a* are formed of, for example, a non-magnetic body such as an aluminum alloy (for example, A5052). As the material of the posts 3*a*, various non-magnetic bodies, such as other aluminum alloys, copper-based alloys such as brass, and austenitic stainless steel alloys, can be used.

The angle sensor support substrate 5 is fixed to protruding ends of the posts 3a by using substrate mounting screws 8a. FIG. 2 illustrates the angle sensor support substrate 5 provided to cover the inside of the encoder. The angle sensor support substrate 5 has a substantially rectangular shape in the plan view and is a thin plate-shaped printed wiring substrate in the axial direction. The angle sensor support substrate 5 is mainly mounted with the angle sensors Sp, Sq, and Sr, the microcomputer 121, and various coils.

The post support hole 3c is provided for inserting the substrate mounting screw 8a when the posts 3a are supported on the base portion 3b of the gear base part 3. The screw hole 3d is provided for inserting a gear base part fixing screw 8c for fixing the gear base part 3 to the motor 1. The notch portion 3e is a cutout provided for passing the screw 8e for fixing the case 4 and the shield plate 7 to the motor 1. The main spindle insertion hole 3f is a hole for inserting the main spindle 1a of the motor 1 into the absolute encoder 2 side. The first intermediate gear shaft support portion 3g is provided to pivotally support the central axis of the first intermediate gear 20.

The first intermediate gear shaft support portion 3g is a member having a protruding shape protruding from the base portion 3b in the positive direction of the Z-axis by cutting a part of the base portion 3b of the gear base part 3 and is formed with a hole to insert the shaft 23 of the first intermediate gear 20. With such a configuration, the first intermediate gear 20 is rotatably supported on the rotation axis.

Next, a method of manufacturing the gear base part 3 as a magnetic flux shielding member is described.

The gear base part 3 is manufactured by the following processes. That is, the gear base part 3 is manufactured by a machining process of performing machining on a plate-shaped member formed of ferritic stainless steel and an annealing process of annealing the machined plate-shaped member in a vacuum or hydrogen atmosphere at an annealing temperature of 800° C. to 900° C.

Specifically, a machining process of forming the machined portions on a magnetic body plate-shaped member formed of ferritic stainless steel such as SUS430 is performed. In the machining process, the external shape of the base portion 3b of the gear base part 3, and the machined portions such as the post support holes 3c, the screw holes 3d, the notch portions 3e, the main spindle insertion hole 3f, and the first intermediate gear shaft support portions 3g are formed from the magnetic body plate-shaped member by punching and bending (machining in the present embodiment). This machining process forms a schematic configuration of the gear base part 3 illustrated in FIG. 10.

After the machining process is performed, the annealing process is performed to anneal the magnetic body plate-shaped member in a vacuum or hydrogen atmosphere at the annealing temperature of 800° C. to 900° C. for a predetermined time (for example, several hours). By caulking after the annealing process is performed, the gear base part 3 can be formed from the magnetic body plate-shaped member without tilting of the posts 3a.

Next, the operation of the absolute encoder 2 is described.

First, so-called magnetic interference. In the magnetic interference, for example, a part of a magnetic flux generated by the motor 1 disposed adjacent to the absolute encoder 2 affects the angle sensors Sp, Sq, and Sr for detecting the magnets Mp, Mq, and Mr of the absolute encoder 2.

The absolute encoder 2 is attached to an opposite side of the main spindle 1a as the output shaft of the motor 1, in order to shorten the total length (dimension in the Z-axis direction). Therefore, in the absolute encoder 2, since the distance between the motor 1 and the angle sensors Sp, Sq, and Sr is shortened, the angle sensors Sp, Sq, and Sr are easily affected by a leakage magnetic flux. Furthermore, as the motor 1 is reduced in size, the distance between the angle sensors Sp, Sq, and Sr and the permanent magnet of the motor 1 is shortened. Therefore, the angle sensors Sp, sq, and Sr are easily affected by a magnetic flux generated from a permanent magnet other than the magnets Mp, Mq, and Mr, magnetic fields of the magnets Mp, Mq, and Mr being to be detected.

Therefore, in the angle sensors Sp, Sq, and Sr, a precise waveform may not be detected when the magnetic interference occurs.

The absolute encoder 2 includes the gear base part 3 as a magnetic flux shielding member formed on a bonding surface with the motor 1 by using an annealed magnetic body.

In the absolute encoder 2, the gear base part 3 is formed of a magnetic body, and a leakage magnetic flux generated by the rotation of the motor 1 or a magnetic flux of an external magnetic field such as a magnetic field of another permanent magnet flows into the gear base part 3, enabling the magnetic flux to be prevented from flowing toward the upper side in the Z-axis direction of the gear base part 3, that is, toward the angle sensors Sp, Sq, and Sr provided inside the case 4 of the absolute encoder 2.

Specifically, in the gear base part 3, the magnetic body plate-shaped member of SUS430, that is, a ferritic stainless steel formed with the machined portions as described above, is annealed. The SUS 430 does not require surface treatment, has excellent corrosion resistance, and has the strength required as a member for holding the gears and the like of the absolute encoder 2, but has magnetic permeability lower than magnetic permeability of permalloy or pure iron. Furthermore, the magnetic body plate-shaped member is machined into a predetermined shape, causing work hardening in the machined portion or strain inside. Therefore, a magnetic body to be used for the gear base part 3 has a variation in the magnetic permeability due to the machining, also causing a variation in the reduction of the magnetic flux.

In this regard, the gear base part 3 formed of a magnetic body is annealed in the absolute encoder 2, and a variation in magnetic permeability and a variation in the reduction of a magnetic flux are reduced compared to the case of no annealing treatment, enabling the angle sensors Sp, Sq, and Sr to suppress the influence of a magnetic flux arriving from the outside.

In the absolute encoder 2, the gear base part 3 formed of a magnetic body is annealed, enabling magnetic permeability lower than the magnetic permeability of pure iron or permalloy to be increased.

Table 1 below is a table indicating magnetic flux shielding properties of the gear base part 3 due to the presence or absence of annealing treatment. Table 1 below shows the difference in magnetic flux density measured inside the gear base part 3 due to the presence or absence of annealing treatment performed on the gear base part 3 when the magnetic flux density of a magnetic flux from the outside of the gear base part 3 is changed to 0, 0.7, and 2.0 [mT] in a case where the temperature of the motor 1 is 55° to 58°. In Table 1 below, N1 to N3 indicate numbers for specifying samples of the gear base part 3. Furthermore, in Table 1 below, positive and negative values of magnetic flux density transmitted indicate the direction of the magnetic flux.

TABLE 1

| Measured at motor temperatures 55° to 58° | | Magnetic flux density [mT] | | | Change amount [0.7 → 2.0] |
| --- | --- | --- | --- | --- | --- |
| | | 0 | 0.7 | 2 | |
| No annealing | N1 | −0.60 | −0.52 | −0.50 | 0.02 |
| | N2 | 0.00 | 0.00 | 0.10 | 0.10 |
| | N3 | 0.05 | 0.15 | 0.06 | −0.09 |
| | Mean | −0.18 | −0.12 | −0.11 | 0.01 |
| | Dispersion | 0.09 | 0.08 | 0.08 | 0.00 |
| | Standard Deviation | 0.30 | 0.29 | 0.27 | 0.02 |
| Annealing | N1 | 0.00 | −0.04 | −0.05 | −0.01 |
| | N2 | 0.00 | −0.04 | −0.05 | −0.01 |
| | N3 | 0.00 | −0.04 | −0.05 | −0.01 |
| | Mean | 0.00 | −0.04 | −0.05 | −0.01 |
| | Dispersion | 0.00 | 0.00 | 0.00 | 0.00 |
| | Standard Deviation | 0.00 | 0.00 | 0.00 | 0.00 |

According to Table 1 above, performing the annealing treatment enables the gear base part 3 to have reduced magnetic flux density transmitting. Furthermore, according to Table 1 above, performing the annealing treatment enables the gear base part 3 to suppress an increase in the amount of change when the value of the magnetic flux density from the outside of the absolute encoder 2 increases, that is, an increase in the magnetic flux as the magnetic flux density of an external magnetic flux increases. Furthermore, performing the annealing treatment causes the gear base part 3 to suppress the dispersion of the transmitted magnetic flux due to the individual difference of the magnetic body plate-shaped member or the standard deviation, improving the effect of shielding the magnetic flux due to the individual difference of the gear base part 3.

As described above, the absolute encoder 2 allows for reducing the influence of a leakage magnetic flux, not supposed to be detected, from a permanent magnet inside the motor 1 on a magnetic sensor for detecting a magnetic flux from a permanent magnet for angle detection.

Furthermore, the absolute encoder 2 includes the holder part 16 formed of a non-magnetic body and holding an outer peripheral surface of the magnet Mp in the radial direction. When the holder part 16 is formed of a soft magnetic body, the influence of magnetization remains due to the influence of hysteresis when a magnetic field is received. That is, when the holder part 16 is formed of a soft magnetic body, the holder part 16 is affected by a residual magnetic flux when the holder part 16 is close to the angle sensors Sq and Sr. Furthermore, in a case where the holder part 16 is formed of a soft magnetic body, a magnetic flux due to an external magnetic field is pulled toward the member when the holder part 16 receives the external magnetic field. As described above, providing the holder part 16 formed of a non-magnetic body enables the absolute encoder 2 to prevent disturbance of a magnetic field in the vicinity of the angle sensors Sq and Sr.

Furthermore, in the absolute encoder 2, the posts 3a for supporting the angle sensor support substrate 5 for supporting the angle sensors Sp and Sq at a position separated from the magnet Mp and the magnet Mq in the axis x direction of the main spindle is formed of a non-magnetic body. Similar to the holder part 16 described above, when the posts 3a are formed of a soft magnetic body, the influence of magnetization remains due to the influence of hysteresis when a magnetic field is received. When the posts 3a are close to the angle sensors Sq and Sr, the influence of the residual magnetic flux appears. Furthermore, in a case where the posts 3a are formed of a soft magnetic body, a magnetic flux due to an external magnetic field is pulled toward the member when the external magnetic field is received. Forming the posts 3a of a non-magnetic body enables the absolute encoder 2 to prevent disturbance of a magnetic field in the vicinity of the angle sensors Sq and Sr.

That is, forming the holder part 16 and the posts 3a of a non-magnetic body causes no magnetic body to be disposed in the vicinity of the angle sensors Sq and Sr in the absolute encoder 2, enabling a magnetic flux to be uniformly absorbed by the annealed gear base part 3.

The embodiment of the present invention has been described above; however, the present invention is not limited to the absolute encoder 2 according to the embodiment of the present invention described above, and includes all aspects included in the concepts and claims of the present invention. Furthermore, the respective configurations may be selectively combined as appropriate or may be combined with a known technology so as to achieve at least a part of the above-described problems and the effects. For example, a shape, a material, an arrangement, a size, and the like of each of the components in the embodiment described above may be changed as appropriate according to a specific usage aspect of the present invention.

REFERENCE SIGNS LIST

1 Motor
1a Main spindle
1b Press-fitting part
2 Absolute encoder
3 Gear base part
3a Post
3b Base portion
3c Post support hole
3d Screw hole
3e Notch portion
3f Main spindle insertion hole
3g First intermediate gear shaft support portion
4 Case
4a Outer wall portion
5 Angle sensor support substrate
5a Lower surface
6 Connector
7 Shield plate
8a Substrate mounting screw
8c Gear base part fixing screw
8e Screw
10 Main spindle gear
11 First worm gear part
16 Holder part
17 Magnet support part
20 First intermediate gear
21 First worm wheel part
22 Second worm gear part
23 Shaft
28 Third worm gear part
30 Second intermediate gear
31 Third worm wheel part
32 First spur gear part
35 Magnet holder
40 First sub-shaft gear
41 Second worm wheel part
50 Second sub-shaft gear
51 Second spur gear part
121 Microcomputer
121b Table processing unit
121c Rotation amount specifying unit
121e Output unit 121p Rotation angle acquisition unit
121q Rotation angle acquisition unit
121r Rotation angle acquisition unit
Mp, Mq, Mr Magnet
Sp, Sq, Sr Angle sensor

The invention claimed is:

1. An absolute encoder, comprising:
a first driving gear configured to rotate according to rotation of a main spindle;
a first permanent magnet provided at a leading end side of the first driving gear;
a first angle sensor configured to detect a rotation angle of the first driving gear corresponding to a change in a magnetic flux generated from the first permanent magnet;
a first driven gear having a central axis orthogonal to a central axis of the first driving gear and configured to mesh with the first driving gear, and having a through hole through which the central axis extends;
a second driving gear provided coaxially with the first driven gear and configured to rotate according to rotation of the first driven gear;
a second driven gear having a central axis orthogonal to the central axis of the first driven gear and configured to mesh with the second driving gear;
a second permanent magnet provided at a leading end side of the second driven gear;
a second angle sensor configured to detect a rotation angle of the second driven gear corresponding to a change in a magnetic flux generated from the second permanent magnet; and
a gear base configured to surround at least a part of a periphery of the first angle sensor and the second angle sensor and having a shaft support portion through which the central axis of the first driven gear extends, wherein
the gear base is formed of an annealed magnetic body.

2. The absolute encoder according to claim 1, wherein the gear base is a plate-shaped member provided between the first angle sensor and a driving source for rotating the main spindle or between the second angle sensor and the driving source.

3. The absolute encoder according to claim 1, further comprising:
a holder part formed of a non-magnetic body and configured to hold an outer peripheral surface of the first permanent magnet in a radial direction.

4. The absolute encoder according to claim 1, further comprising:
an angle sensor support substrate configured to support the first angle sensor and the second angle sensor at a position separated from the first permanent magnet and the second permanent magnet in an axial direction of the main spindle; and
a post formed of a non-magnetic body and configured to support the angle sensor support substrate.

* * * * *